(12) United States Patent
Tang et al.

(10) Patent No.: US 10,177,860 B2
(45) Date of Patent: Jan. 8, 2019

(54) CO-EXISTENCE MANAGEMENT BETWEEN MITIGATION TECHNIQUES

(71) Applicant: APPLE INC., Cupertino, CA (US)

(72) Inventors: Jia Tang, San Jose, CA (US); Zhu Ji, San Jose, CA (US)

(73) Assignee: APPLE INC., Cupertino, CA (US)

( * ) Notice: Subject to any disclaimer, the term of this patent is extended or adjusted under 35 U.S.C. 154(b) by 0 days.

(21) Appl. No.: 15/611,911

(22) Filed: Jun. 2, 2017

(65) Prior Publication Data
US 2018/0351658 A1   Dec. 6, 2018

(51) Int. Cl.
  *H04B 15/00*  (2006.01)
  *H04B 17/336* (2015.01)
  *H04W 88/02*  (2009.01)
(52) U.S. Cl.
  CPC .......... *H04B 15/00* (2013.01); *H04B 17/336* (2015.01); *H04W 88/02* (2013.01)
(58) Field of Classification Search
  None
  See application file for complete search history.

(56) References Cited

U.S. PATENT DOCUMENTS

| | | | | |
|---|---|---|---|---|
| 2013/0279355 A1* | 10/2013 | Sadek | ................... | H04L 1/0026 370/252 |
| 2014/0135028 A1* | 5/2014 | Wang | ................ | H04W 72/1205 455/452.2 |
| 2014/0233457 A1* | 8/2014 | Koutsimanis | .......... | H04J 11/005 370/328 |
| 2015/0327249 A1* | 11/2015 | Kitazoe | ............. | H04W 72/0413 370/329 |
| 2016/0029231 A1* | 1/2016 | Kazmi | ............. | H04W 72/1226 370/252 |
| 2016/0192373 A1* | 6/2016 | Li | ......................... | H04J 11/003 370/329 |

* cited by examiner

*Primary Examiner* — Alejandro Rivero
(74) *Attorney, Agent, or Firm* — Fay Kaplun & Marcin, LLP

(57) ABSTRACT

Method and apparatus for co-existence management between mitigation techniques where a user device ("UE") is connected to a base station ("BS") of a network. The UE may receive a first value of a BS parameter from the BS and may determine a second value of a signal quality parameter corresponding to a signal received by the UE from the BS. The UE may then select an operating mode for the UE based on the first value and the second value, where the operating mode comprises implementing at least one interference mitigation technique.

17 Claims, 5 Drawing Sheets

CO-EXISTENCE MANAGEMENT BETWEEN MITIGATION TECHNIQUES

BACKGROUND INFORMATION

Wireless communication systems are rapidly growing in usage. Further, wireless communication technology has evolved from voice-only communications to also include the transmission of data, such as Internet and multimedia content. A user equipment ("UE") may be configured to establish a connection with different types of networks through the use of wireless communications protocols. Accordingly, based upon the capabilities of the hardware and software of the UE, the connection may be made with these different types of networks. For instance, the network may be a Universal Mobile Telecommunication System ("UMTS") or Long Term Evolution ("LTE") network for data connectivity, or the network may be a Global System for Mobile Communications ("GSM") or Code Division Multiple Access ("CDMA") network for voice connectivity. Furthermore, each of these networks may utilize different radio access standards, such as evolved UMTS Terrestrial Radio Access Network ("EUTRAN"), Universal Terrestrial Radio Access Network ("UTRAN"), and GSM EDGE Radio Access Network ("GERAN").

LTE, commonly referred to a "4G LTE," is a standard for wireless communication of high-speed data for mobile phones and data terminals. The LTE standard has been developed by the 3rd Generation Partnership Project ("3GPP") and is described as a natural upgrade path for carriers using prior generation networks or "legacy" protocols or 2G/3G networks, such as GSM/UMTS protocols and CDMA 2000 1× (e.g., 1×RTT or simply "1×") wireless communication protocols. In addition, standards are being developed for new 5G networks. Each of these different types of networks and protocols may be termed radio access technologies ("RATs").

A UE may be configured to communicate wirelessly with a network by associating with a base station ("BS") of the network. The UE may include a network application that is executed to perform this functionality of joining the network and associating with the BS. The network may operate using a predetermined RAT. When more than one network and/or more than one BS is available for association in a given location of the UE, the UE may connect to any one of these BSs as long as the UE is configured to operate on the corresponding RAT.

When connected to a network, the UE may perform a variety of techniques to mitigate external and internal inference, conserve battery life, improve transmission and reception processes, etc. However, with an increasing amount of the mitigation techniques, co-existence issues may arise. As such, various exemplary embodiments related to co-existence management between the various mitigation techniques are described herein.

SUMMARY

The present application discloses a device, system and apparatus for co-existence management between mitigation techniques. In a first aspect, a method is disclosed where a user device ("UE") is connected to a base station ("BS") of a network. The UE may receive a first value of a BS parameter from the BS and may determine a second value of a signal quality parameter corresponding to a signal received by the UE from the BS. The UE may then select an operating mode for the UE based on the first value and the second value, where the operating mode comprises implementing at least one interference mitigation technique.

In a second aspect, a UE is disclosed. The UE may have a transceiver that is configured to receive a first value of a base station ("BS") parameter and a signal from a BS. The UE may also have a processor configured to determine a second value of a signal quality parameter based on the signal received from the BS and select an operating mode for the UE based on the first value and the second value, where the operating mode comprises implementing at least one interference mitigation technique.

In a third aspect, an integrated circuit is disclosed. The integrated circuit may have circuitry to receive a first value of a base station ("BS") parameter and to determine a second value of a signal quality parameter. The integrated circuit may further have circuitry to select an operating mode based on the first value and the second value, where the operating mode comprises implementing at least one interference mitigation technique.

DETAILED DESCRIPTION

Figure 1:
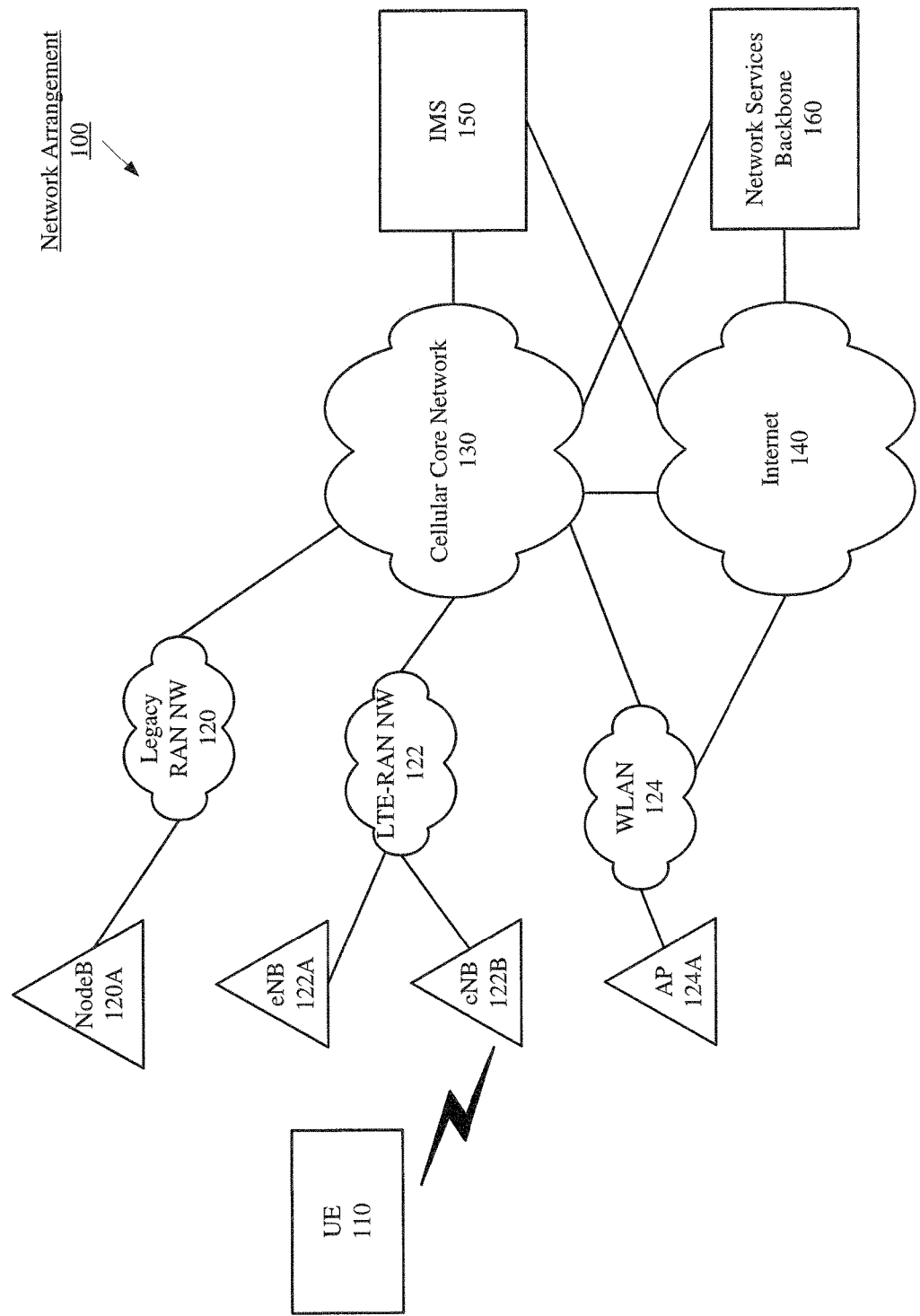
FIG. 1 shows a network arrangement according to various exemplary embodiments described herein.

The exemplary embodiments may be further understood with reference to the following description and the related appended drawings, wherein like elements are provided with the same reference numerals. The exemplary embodiments are related to a device, system, and method for co-existence management between difference user device ("UE") operating modes that, as will be explained below in greater detail, may not operate simultaneously. The operating modes may relate to using one or more mitigation techniques that may be implemented by the UE to mitigate external and internal inference, conserve battery life, improve transmission and reception processes, etc. Prior to discussing the mitigation techniques, FIG. 1 will discuss a network arrangement where the UE may experience interference.

FIG. 1 shows an exemplary network arrangement 100, according to various embodiments described herein. The exemplary network arrangement 100 includes UE 110. The UE 110 may be any type of electronic component that is configured to communicate via a network, e.g., smartphones, tablets, phablets, embedded devices, wearables, Internet of Things ("IoT") device etc. It should also be understood that an actual network arrangement may include any number of UEs. The example of one (1) UE 110 is only provided for illustrative purposes.

The UE 110 may be configured to communicate directly with one or more networks. In this example, the networks with which the UE 110 may communicate are a legacy radio access network (RAN) 120, a Long Term Evolution radio access network (LTE-RAN) network 122 and a wireless local area network (WLAN) 124. In this example, each of the networks 120-124 is a wireless network with which the UE 110 may communicate wirelessly. However, it should be understood that the UE 110 may also communicate with other types of networks using a wired connection.

The legacy RAN 120 and the LTE-RAN 122 are portions of cellular networks that may be deployed by cellular providers (e.g., Verizon, AT&T, Sprint, T-Mobile, etc.). These networks 120 and 122 may include, for example, base client stations 120A, 122A, 122B (Node Bs, eNodeBs, HeNBs, etc.) that are configured to send and receive traffic from UE. Examples of the legacy RAN 120 may include those networks that are generally labeled as 2G and/or 3G networks and may include circuit switched voice calls and packet switched data operations. Those skilled in the art will understand that the cellular providers may also deploy other types of networks, including further evolutions of the cellular standards, within their cellular networks. The WLAN 124 may include any type of wireless local area network (WiFi, Hot Spot, IEEE 802.11x networks, etc.). Those skilled in the art will understand that there may be thousands, hundreds of thousands or more of different WLANs deployed in the United States alone. For example, the WLAN 124 may be a user's home network, the user's work network, a public network (e.g., at a city park, coffee shop, etc.). Generally, the WLAN 124 will include one or more access points 124A ("AP") that allow the UE to communicate with the WLAN 124.

When connected to one or more of the base client stations (e.g., serving base client station), the UE 110 may experience interference from other base client stations and/or APs (e.g., interfering base client station). For example, the interfering base client station may be transmitting signals that are interfering with the signals transmitted to the UE 110 by the serving base client station. This interference may be intra-RAT interference or inter-RAT interference. Intra-RAT interference may be signal interference caused by another base client station(s) of the same network. For example, UE 110, as shown in FIG. 1, may be connected to the LTE-RAN 122 via the eNB 122B (the serving base client station). The eNB 122A (the interfering base client station) may be within a close enough proximity to the UE 110 where the eNB 122A may be transmitting signals that are causing interference with the UE's 110 connection to the eNB 122B. Alternatively, inter-RAT interference may be signal interference caused by an interfering base client station of different a network. For example, UE 110 may be connected to the LTE-RAN 122 via the eNB 122B and at least one of the NodeB 120A or the AP 124A may be causing interference with the UE's 110 connection to the eNB 122B. Mitigating the interference will be discussed below in greater detail.

In addition to the networks 120-124, the network arrangement 100 also includes a cellular core network 130 and the Internet 140. The cellular core network 130, the legacy RAN 120 and the LTE-RAN 122 may be considered a cellular network that is associated with a particular cellular provider (e.g., Verizon, AT&T, Sprint, T-Mobile, etc.). The cellular core network 130 may be considered to be the interconnected set of components that manages the operation and traffic of the cellular network. The interconnected components of the cellular core network 130 may include any number of components such as servers, switches, routers, etc. The cellular core network 130 also manages the traffic that flows between the cellular network and the Internet 140.

The network arrangement 100 also includes an IP Multimedia Subsystem (IMS) 150. The IMS 150 may be generally described as an architecture for delivering multimedia services to the UE 110 using the IP protocol. The IMS 150 may include a variety of components to accomplish this task. For example, a typical IMS 150 includes a Home Subscriber Server (HSS) that stores subscription information for a user of the UE 110. This subscription information is used to provide the correct multimedia services to the user. Other exemplary components of the IMS 150 will be described below, as needed. The IMS 150 may communicate with the cellular core network 130 and the Internet 140 to provide the multimedia services to the UE 110. The IMS 150 is shown in close proximity to the cellular core network 130 because the cellular provider typically implements the functionality of the IMS 150. However, it is not necessary for this to be the case. The IMS 150 may be provided by another party.

Thus, the network arrangement 100 allows the UE 110 to perform functionalities generally associated with computer and cellular networks. For example, the UE 110 may perform voice calls to other parties, may browse the Internet 140 for information, may stream multimedia data to the UE 110, etc.

In addition to the elements already described, the network arrangement 100 also includes a network services backbone 160 that is in communication either directly or indirectly with the Internet 140 and the cellular core network 130. The network services backbone 160 may be generally described as a set of components (e.g., servers, network storage arrangements, etc.) that implement a suite of services that may be used to extend the functionalities of the UE 110 in communication with the various networks. The network services backbone 160 interacts with the UE 110 and/or the networks 120, 122, 124, 130, 140 to provide these extended functionalities.

The network services backbone 160 may be provided by any entity or a set of entities. In one example, the network services backbone 160 is provided by the supplier of one or more of the UEs. In another example, the network services backbone 160 is provided by the cellular network provider. In still a further example, the network services backbone 160 is provided by a third party unrelated to the cellular network provider or the supplier of the UE 110. It should be noted that the network services backbone 160 may be used to associate the UE 110 with a user account such that a call identification of an established call may be propagated among the UE 110. However, it should be understood that the network services backbone 160 may include many other components and services that may be used to enhance the operations of the UR 110 and the networks.

As discussed above, the UE 110 may experience signal interference, in the form of inter-RAT or intra-RAT interference. To mitigate the signal interference experienced by the UE 110, the UE 110 may enable mitigation techniques. It should be noted that the following embodiments of the mitigation techniques are only exemplary and will be used to illustrate the co-existence management discussed above. Specifically, the mitigation techniques are techniques generally associated with UEs operating on an LTE network. However, those skilled in the art would understand that interference may be experienced on any network and any mitigation techniques may be implemented by the UE. The exemplary embodiments of the co-existence management described herein may be adapted to the other types of mitigation techniques.

In an exemplary embodiment, the mitigation techniques may be associated with an advanced receiver ("ARx"). The ARx may refer to the UE 110 enabling advanced reception techniques, which may be used to achieve superior downlink performance in the UE 110. A first exemplary embodiment of the mitigation techniques may be cell reference-symbol interference-mitigation ("CRS-IM"). The CRS-IM may include the UE 110 receiving assistance information from the eNB 122B. The assistance information may include cell reference-symbol based measurements and demodulation data. Further, the CRS-IM may be enabled when signal interference is strong, such as when a signal to interference ratio ("SIR") is low. Thus, for example, if the SIR, which may be measured in decibels ("dBs"), falls below a threshold, the CRS-IM may be enabled.

A second exemplary embodiment of the mitigation techniques may be cell reference-symbol interference-cancellation ("CRS-IC"). The CRS-IC may include the UE 110 subtracting the interfering signal from the interfering base client station from the signal received from the serving client station. Similar to the CRS-IM, the CRS-IC may be enabled when signal interference is strong, such as when the SIR is low. Thus, for example, if the SIR falls below a further threshold, the CRS-IC may be enabled. Those skilled in the art would understand that the UE may disable the CRS-IM to enable the CRS-IC. In one exemplary embodiment, it may be considered that the CRS-IC is a more aggressive form of mitigation technique and may be used when the SIR is worse than the CRS-IM, which may be used when the SIR is still not acceptable, but better than the SIR for which the CRS-IC is used. However, this manner of applying mitigation techniques is only exemplary.

Another exemplary embodiment of the mitigation techniques may be physical downlink control channel ("PDCCH") Only Reception ("PDCCH-Only"). The PDCCH is a channel that carries downlink control information ("DCI"). The DCI may include information about which resources the UE is to use for uplink transmissions. PDCCH-Only is a power saving feature that may be implemented by the UE. Specifically, under certain conditions, the UE may prematurely turn off its transceiver (or receiver and/or transmitter) to conserve battery life.

Those skilled in the art would understand that the PDCCH-Only may have multiple variants, such as but not limited to, early PDCCH, only PDCCH, etc. The early PDCCH may include the UE turning off its transceiver when no downlink grant is detected in the PDCCH. The only PDCCH may include the UE turning off its transceiver after a PDCCH is received, regardless of grant information in the PDCCH. In one example, the PDCCH-Only may be enabled when the SIR, a signal to noise ratio ("SNR") or a block error rate ("BLER") satisfies a threshold, e.g., the signal quality of the connection is relatively good. In another example, the PDCCH-Only may be enabled when the SIR, the SNR or the BLER satisfies the threshold and there is a period of inactivity in the subframes exchanged between the UE 110 and the base station. The period of inactivity may refer to the UE 110 receiving a predetermined number of consecutive subframes with no uplink and/or downlink grants, e.g., since the UE 110 has not received any grants for a predetermined number of subframes, the next PDCCH subframe is also likely not to have a grant. It should also be noted that the SIR, the SNR and the BLER may be referred to as signal quality parameters and may be used interchangeably herein. Those skilled in the art would understand that the signal quality parameters may be any parameters related to signal quality.

The exemplary embodiments provide that the UE may utilize operating modes that include one or more of the mitigation techniques. For example, a first operating mode may include the PDCCH-Only, a second operating mode may include the CRS-IM and the PDCCH-Only, a third operating mode may include the CRS-IC, etc. In some scenarios, it may be adverse for two or more of the mitigation techniques to be enabled simultaneously. For example, the UE running both the CRS-IC and the PDCCH-Only may cause undesired issues. However, this is only exemplary and the operating modes may include any combination of mitigation techniques. In some exemplary embodiments, the SIR, SNR and/or BLER thresholds may be used to enable different operating modes. For example, the UE may be in the first operating mode (e.g., PDCCH-Only). If the SIR, SNR and/or BLER falls below a first threshold, the UE may disable the first operating mode and enable the second operating mode (e.g., CRS-IM and PDCCH-Only). If the SIR falls below a second threshold, the UE may disable the second operating mode and enable the third operating mode (e.g., CRS-IC). This exemplary operation will be described in greater detail below.

It should be noted that the above described operating modes are only exemplary. Those skilled in the art would understand that an operating mode may include any and as many mitigation techniques as desired. It should also be noted that the above discussed mitigation techniques are only exemplary and that others may be used, such as joint demodulating serving, neighbor cell-specific reference signal ("CRS") or physical downlink shared channel ("PDSCH") symbol. Further, those skilled in the art would understand that the SIR threshold to engage/disengage the operating modes may be of any value and of any quantity. Lastly, those skilled in the art would understand that the use of the SIR, SNR and/or BLER as a trigger between operating modes is only exemplary and that other triggers may be used.

While the above exemplary embodiments account for parameters of the UE, they fail to take into account parameters of a base station ("BS"), such as the eNB 122B. For example, the BS parameter may include a scheduling rate ("SR"), a time division duplex ("TDD") configuration, a carrier aggregation ("CA") configuration, a preamble reactive barrier ("PRB") configuration, etc. The SR relates to a percentage of a maximum throughput possible by the BS. Furthermore, the SR may heavily impact certain mitigation techniques, such as the PDCCH-Only. For example, when the SR is high, the UE 110 is likely to be receiving a grant in almost every PDCCH subframe. As described above, one of the enabling conditions for entering the PDCCH-Only may be that the UE 110 has experienced a certain number of subframes with missing grants. When the SR is high, this condition is unlikely to be satisfied and the UE 110 is unlikely to enter the PDCCH-Only. However, with a static SIR value (or other signal quality parameter) there is a lost opportunity for performing other types of mitigation techniques (e.g., CRS-IC, CRS-IM, etc.). To provide a specific example, if the SIR threshold was statically set to a value of 6 dB regardless of the SR value (e.g., above 6 dB is the threshold for PDCCH-Only and below 6 dB is the threshold for other mitigation techniques) and the SR was high, then it would be likely that neither the PDCCH-Only or the other mitigation techniques would be used when the SIR is above the threshold, e.g., the SIR is between 6 dB and 12 dB. This is a lost opportunity to use the other mitigation techniques when it is unlikely that PDCCH-Only is going to be used. The exemplary embodiments resolve this lost opportunity by using a variable SIR threshold (signal quality parameter value) that is based on the SR parameter value (base station parameter value). It should be noted that in the following exemplary embodiments the SR will be used as the example base station parameter and the SIR is used as the exemplary signal quality parameter. However, it should be understood that the base station parameters may relate to any parameters of a BS, a network, etc., and the signal quality parameters may relate to any parameter that relates to the quality of the signals exchanged between the base station and the UE 110.

As such, the following exemplary embodiments disclose a system and method for co-existence management between the mitigation techniques. In particular, the following exemplary embodiments disclose co-existence management using at least two parameters (e.g., SIR, scheduling load, SR, SNR, BLER, etc.) to determine which operating mode, and thereby which mitigation techniques, the UE is to use.

Figure 2:
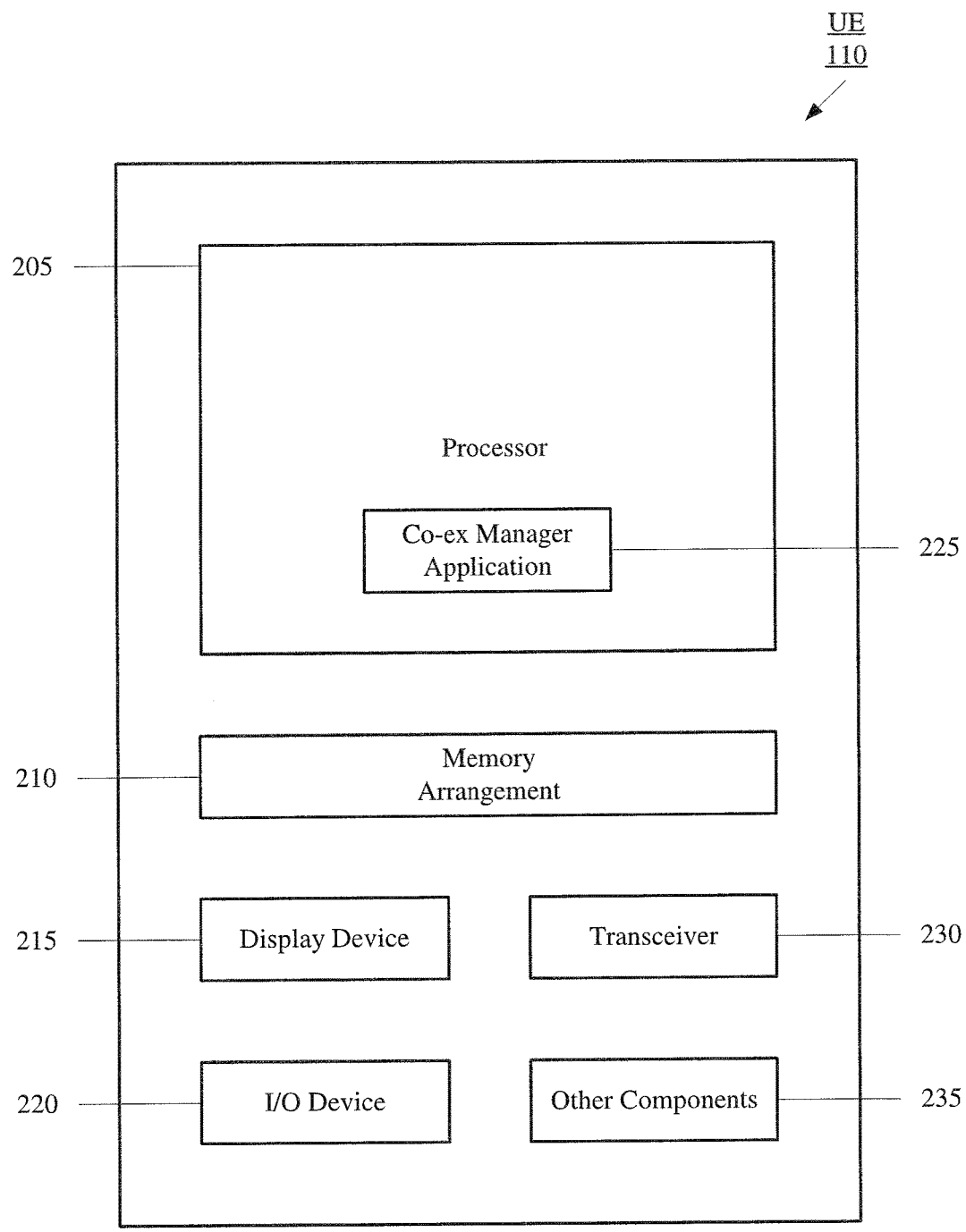
FIG. 2 shows a user equipment according to various exemplary embodiments described herein.

FIG. 2 shows an exemplary UE 110 according to various embodiments described herein. The UE 110 may represent any electronic device that is configured to perform wireless functionalities described herein. Accordingly, the UE 110 may be a portable device such as a smartphone, a tablet, a phablet, a laptop, a wearable, etc. In another example, the UE 110 may be a client stationary device such as a desktop terminal. The UE 110 may be configured to perform cellular and/or WiFi functionalities. The UE 110 may include a processor 205, a memory arrangement 210, a display device 215, an input/output (I/O) device 220, a co-existence ("co-ex") manager application 225 a transceiver 230, and other components 235. The other components 235 may include, for example, an audio input device, an audio output device, a battery, a data acquisition device, ports to electrically connect the UE 110 to other electronic devices, etc.

The processor 205 may be configured to execute a plurality of applications of the UE 110, including but not limited to the co-ex manager application 225. It should be noted that the above noted applications each being an application (e.g., a program) executed by the processor 205 is only exemplary. The functionality associated with the applications may also be represented as a separate incorporated component of the UE 110 or may be a modular component coupled to the UE 110, e.g., an integrated circuit with or without firmware. In addition, in some UEs, the functionality described for the processor 205 is split among two processors, a baseband processor and an application processor. The exemplary embodiments may be implemented in any of these or other configurations of a UE.

The memory 210 may be a hardware component configured to store data related to operations performed by the UE 110. Specifically, the memory 210 may store data related to various applications. The display device 215 may be a hardware component configured to show data to a user while the I/O device 220 may be a hardware component that enables the user to enter inputs. It should be noted that the display device 215 and the I/O device 220 may be separate components or integrated together such as a touchscreen.

The co-ex manager application 225 may be a software component, such as an application, or a hardware component capable of switching between operating modes. The transceiver 230 may be a hardware component configured to transmit and/or receive data. That is, the transceiver 230 may enable communication with other electronic devices directly or indirectly through one or more networks based upon an operating frequency of the network. The transceiver 230 may operate on a variety of different frequencies or channels (e.g., set of consecutive frequencies) that are related to the VoLTE call functionality. Thus, one or more antennas (not shown) coupled with the transceiver 130 may enable the transceiver 230 to operate on the EUTRAN frequency band as well as over a WiFi network. Accordingly, the transceiver 230 may include any number of components such as a cellular modem and non-cellular wireless communication components, such as a WiFi modem, a GNSS receiver, etc.

Figure 3:
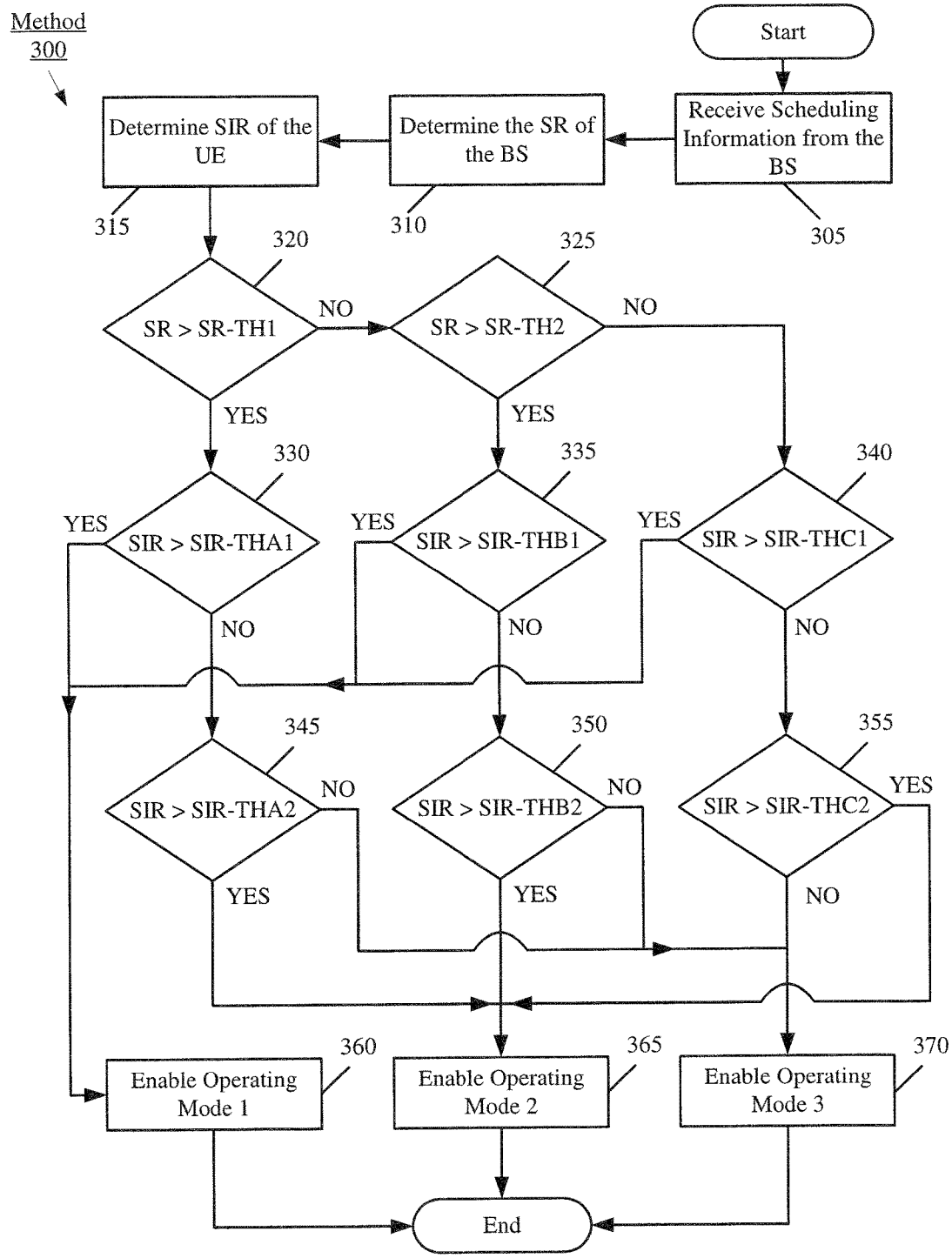
FIG. 3 shows a method for co-existence management according to various exemplary embodiments described herein.
Figure 4:
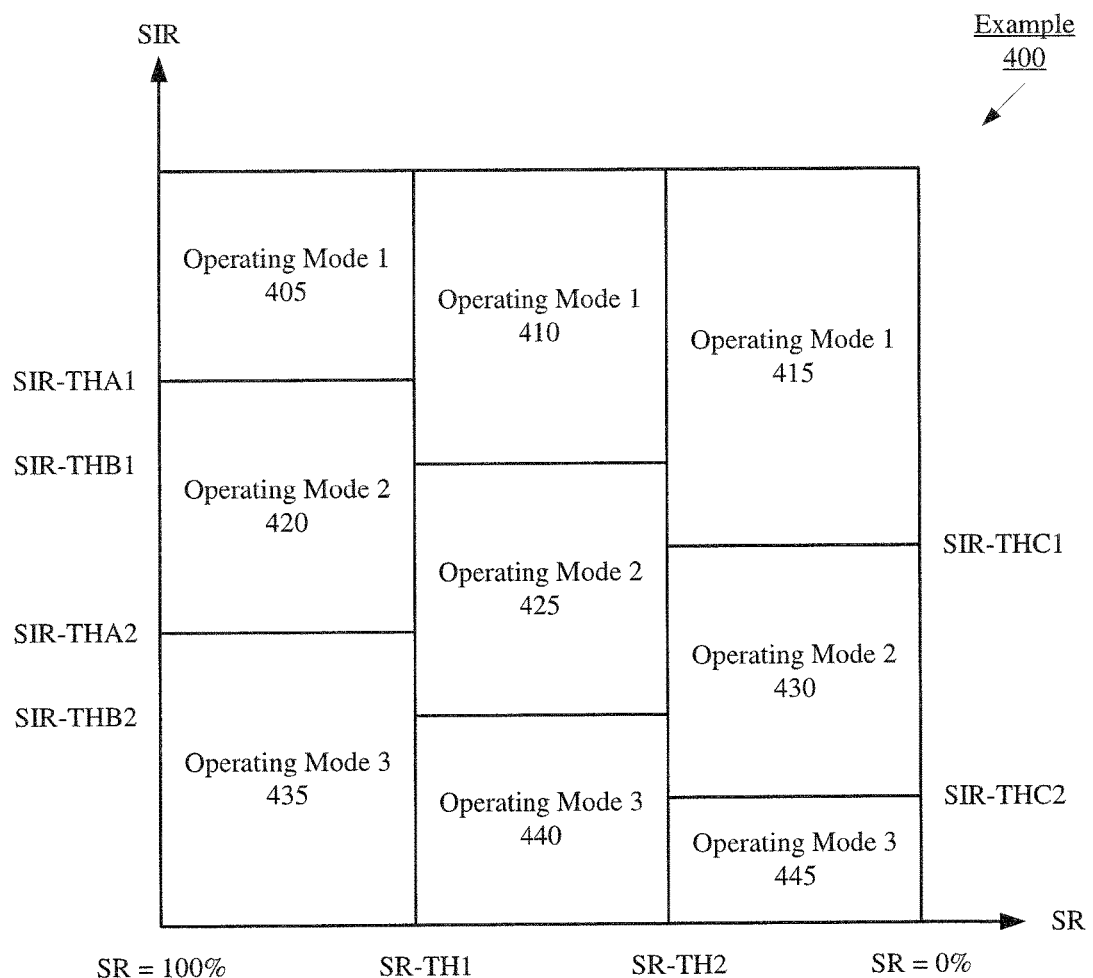
FIG. 4 shows an example of co-existence management according to various exemplary embodiments described herein.

FIG. 3 shows a method 300 for operating the co-ex manager application 225 for co-existence management according to the exemplary embodiments. FIG. 3 may be further understood with reference to FIG. 4, which shows an exemplary embodiment of method 300 in graph form. It should be noted that while the exemplary method 300 is described as being performed by the co-ex manager application 225, any combination of hardware and software components of the UE 110, such as, but not limited to the processor 205, a baseband processor, an application processor, etc., may be capable of performing the methods described herein. It should also be considered that the UE 110 is currently connected to the LTE-RAN 122 with the eNB 122B as the serving base client station.

It should further be noted that method 300 will discuss selecting an operating mode by determining the SIR of the UE 110 and the SR of the cellular base station 120. However, those skilled in the art would understand that using the SIR and the SR is only exemplary. That is, functions of method 300 may use other parameters, such as the SNR or the BLER, to select the operating mode.

In 305, the co-ex manager application 225 may receive scheduling information from the eNB 122B. In 310, the co-ex manager application 225 may determine the SR of the cellular base station 120 from the scheduling information. As discussed above, the SR may relate to the percentage of the maximum throughput possible by the BS and thus may be represented as an SR percentage (%) as shown on the horizontal axis of FIG. 4.

In 315, the co-ex manager application 225 may determine the SIR being experienced by the UE 110. Specifically, as discussed above, the SIR is the signal to interference ratio and may be measured in dBs. The SIR is shown by the vertical axis of FIG. 4. As also discussed above, the exemplary embodiments are not limited to the two parameters being the SR and the SIR. These are only used as examples and other BS parameters beside SR may be used and other signal quality parameters beside SIR (e.g., SNR, BLER, etc.) may be used.

In 320, the co-ex manager application 225 may determine whether the SR is greater than a first SR threshold ("SR-TH1"). For example, the SR-TH1 may be a value of 80%. The SR-TA1 and all other SR-THX are shown on the horizontal axis of FIG. 4. Those skilled in the art would understand the value of the SR-TH1, and any other thresholds discussed herein, are only used as examples for illustrative purposes. As such, any value can be set to SR-TH1 and any other threshold discussed herein. If the SR is greater than SR-TH1, method 300 may proceed to 330.

In 330, the co-ex manager application 225 may determine whether the SIR is greater than a first A-class SIR threshold ("SIR-THA1"). For example, the SIR-THA1 may be 12 dB. The SIR-THA1 and all other SIR-THX are shown on the vertical axis of FIG. 4. Again. those skilled in the art would understand the value of the SIR-THA1, and any other thresholds discussed herein, is only used as an example for illustrative purposes.

It should be noted that each class of the SIR threshold (e.g., A, B, C, etc.) may be used as a designating characteristic of a SR threshold. For example, when the SR is greater than the SR-TH1, the subsequent SIR thresholds may be designated as A-class. When the SR is between the SR-TH1 and the SR-TH2, the subsequent SIR thresholds may be designated as B-class, etc. Those skilled in the art would understand that the classes are for clarity. It is also noted that in this exemplary embodiment, the parameter associated with the BS (e.g., the SR) is the primary parameter and the parameter associated with the signal quality (e.g., the SIR) is the secondary parameter, e.g., the thresholds used for the SIR are based on the value (or threshold) of the SR. However, this is only exemplary, and the situation may be reversed, e.g., the signal quality parameter may be the primary parameter and the BS parameter may be the secondary parameter.

Returning to 330, if the SIR is greater than the SIR-THA1, the method 300 may proceed to 360. In 360, the co-ex manager application 225 may enable operating mode 1. A graphical example of this path may be seen in 405 of FIG. 4, e.g., 405 shows the area of the graph where the SR is greater than SR-TH1 and the SIR is greater than SIR-THA1. In an exemplary embodiment, operating mode 1 may include the PDCCH-Only. It should be noted that operating mode 1 including the PDCCH-Only is only exemplary. Those skilled in the art would understand that operating mode 1 may include any one or combination of the mitigation techniques.

Returning to 330, if the SIR is not greater than the SIR-THA1, the method 300 may proceed to 345. In 345, the co-ex manager application 225 may determine whether the SIR is greater than a second SIR A-class threshold ("SIR-THA2"). For example, the SIR-THA2 may be 4 dB. If the SIR is greater than the SIR-THA2, the method 300 may proceed to 365. In 365, the co-ex manager application 225 may enable operating mode 2. A graphical example of this path may be seen in 420 of FIG. 4. In an exemplary embodiment, operating mode 2 may include the PDCCH-Only and the CRS-IM. Similar to operating mode 1, it should be noted that operating mode 2 including the PDCCH-Only and the CRS-IM is only an exemplary embodiment. Those skilled in the art would understand that operating mode 2 may include any one or combination of the mitigation techniques.

Returning to 345, if the SIR is not greater than the SIR-THA2, the method 300 proceeds to 370. In 370, the co-ex manager application 225 may enable operating mode 3. A graphical example of this path may be seen in 435 of FIG. 4. In an exemplary embodiment, operating mode 3 may include the CRS-IC. Similar to operating modes 1 and 2, it should be noted that operating mode 3 including the CRS-IC is only an exemplary embodiment. Those skilled in the art would understand that operating mode 3 may include any one or combination of the mitigation techniques. Once an operating mode is selected, method 300 may end.

Returning to 320, if the SR is not greater than the SR-TH1, the method 300 may proceed to 325. In 325, the co-ex manager application 225 may determine whether the SR is greater than a second SR threshold ("SR-TH2"). For example, the SR-TH2 may be a value of 200. If the SR is greater than the SR-TH2, the method proceeds to 335. In 335, the co-ex manager application 225 may determine whether the SIR is greater than a first B-class SIR threshold ("SIR-THB1"). For example, the SIR-THB1 may be 10 dB. If the SIR is greater than the SIR-THB1, the method 300 may proceed to 360, where the co-ex manager application 225 may enable operating mode 1. A graphical example of this path may be seen in 410 of FIG. 4.

If the SIR is not greater than the SIR-THB1, the method 300 may proceed to 350. In 350, the co-ex manager application 225 may determine whether the SIR is greater than a second SIR B-class threshold ("SIR-THB2"). For example, the SIR-THB2 may be 2 dB. If the SIR is greater than the SIR-THB2, the method 300 may proceed to 365, where the co-ex manager application 225 may enable operating mode 2. A graphical example of this path may be seen in 425 of FIG. 4. If the SIR is not greater than the SIR-THB2, the method 300 proceeds to 370, where the co-ex manager application 225 may enable operating mode 3. A graphical example of this path may be seen in 440 of FIG. 4.

Returning to 325, if the SR is not greater than the SR-TH2, the method proceeds to 340. In 340, the co-ex manager application 225 may determine whether the SIR is greater than a first C-class SIR threshold ("SIR-THC1"). For example, the SIR-THC1 may be 8 dB. If the SIR is greater than the SIR-THC1, the method 300 may proceed to 360, where the co-ex manager application 225 may enable operating mode 1. A graphical example of this path may be seen in 415 of FIG. 4.

If the SIR is not greater than the SIR-THC1, the method 300 may proceed to 355. In 355, the co-ex manager application 225 may determine whether the SIR is greater than a second SIR C-class threshold ("SIR-THC2"). For example, the SIR-THC2 may be 0 dB. If the SIR is greater than the SIR-THC2, the method 300 proceeds to 365, where the co-ex manager application 225 may enable operating mode 2. A graphical example of this path may be seen in 430 of FIG. 4. If the SIR is not greater than the SIR-THC2, the method 300 proceeds to 370, where the co-ex manager application 225 may enable operating mode 3. A graphical example of this path may be seen in 445 of FIG. 4.

Figure 5:
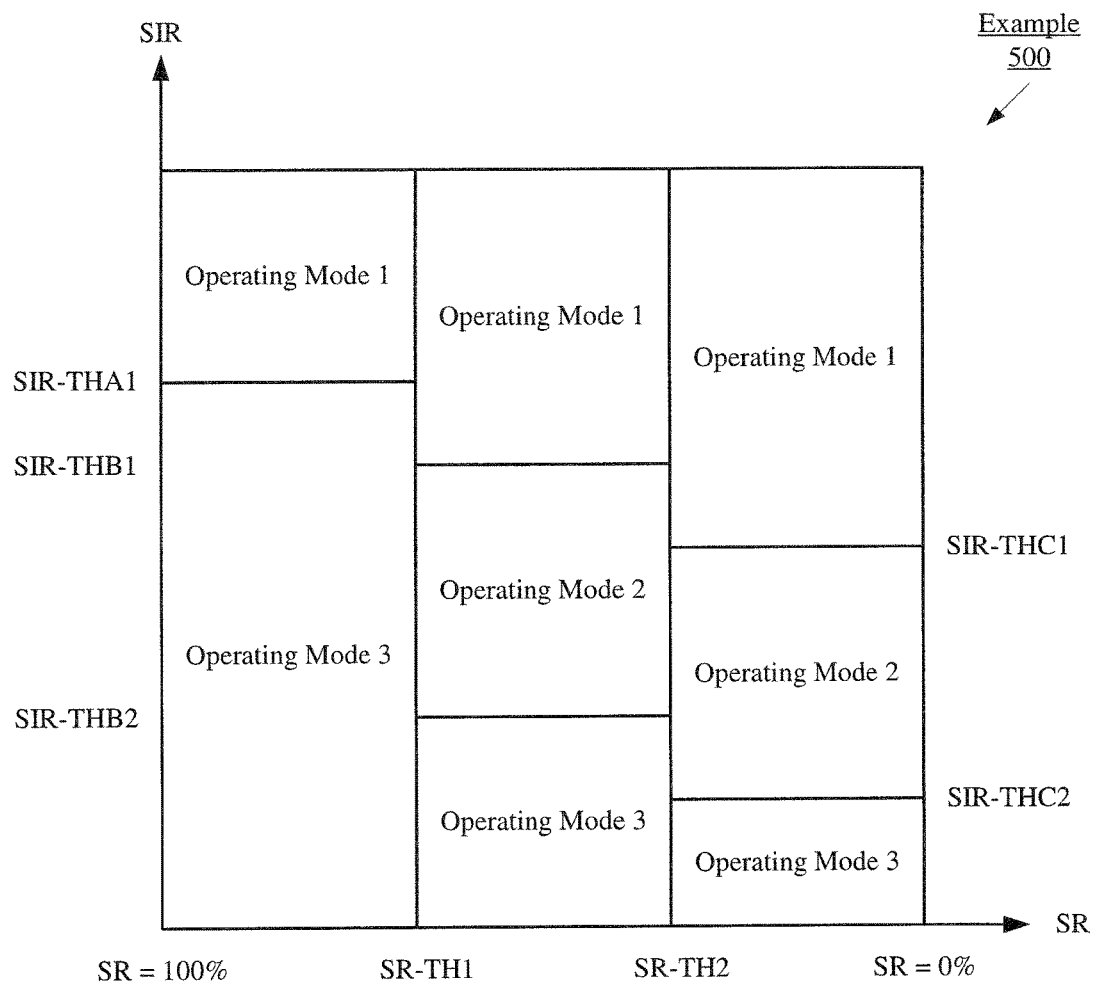
FIG. 5 shows an example of co-existence management according to various exemplary embodiments described herein.

FIG. 5 shows an alternate exemplary embodiment of method 300 in graph form. Specifically, FIG. 5 shows a variation of method 300 where when the SR is greater than SR-TH1, only two operating modes (e.g., operating modes 1 and 3) are available for selection. In such an exemplary embodiment, those skilled in the art would understand that the SIR threshold for determining whether to select the missing operating mode (e.g., mode 2) may be vacant. Here, for example, because only operating mode 1 and 3 is available when the SR is greater than SR-TH1, 345 of method 300 may be vacant. Thus, in 330, if it is determined that the SIR is not greater that the SIR-THA1, the method may proceed directly to 370, where operating mode 3 is enabled.

Those skilled in the art would understand the variation shown in FIG. 5 is only exemplary, and that any one or more operating modes may be vacant or added. In one example, with reference to FIGS. 4, 430 and 445 may be vacant. Thus, of the SR is not greater than SR-TH2, operating mode 1 will be enabled. In another example, 435 and 445 may be vacant. Thus, operating mode 3 is only available when the SR is between SR-TH1 And SR-TH2. In a third example, operating mode 4 (not shown) may be introduced and may have its own threshold for enablement, or may substitute any one or more of 405-445.

It should also be noted that the number of thresholds and the number of parameters that are used are also only exemplary. For example, depending on the number of operating modes, a parameter may have any number of thresholds that correspond to different operating modes. In a further example, there may be three or more parameters used. For example, if three (3) parameters were used the graphs of FIGS. 4 and 5 would have a third dimension (e.g., x, y, z axis.) and the example would resemble a cube with the different operating modes occupying a space of the cube.

Those skilled in the art would understand that every embodiment discussed above pertaining to a value being greater or less than a threshold may include the value being greater or equal to and less than or equal to the threshold. Such a function is a user choice.

Thus, the exemplary embodiments as exemplified by the method 300, have the UE monitoring multiple parameters (e.g., signal quality parameters and/or BS parameters) and based on various thresholds for those parameters, the UE may implement a corresponding co-existence operating mode to mitigate interference.

Those skilled in the art will understand that the above-described exemplary embodiments may be implemented in any suitable software or hardware configuration or combination thereof. An exemplary hardware platform for implementing the exemplary embodiments may include, for example, an Intel x86 based platform with compatible operating system, a Windows OS, a Mac platform and MAC OS, a mobile device having an operating system such as iOS, Android, etc. In a further example, the exemplary embodiments of the above described method may be embodied as a program containing lines of code stored on a non-transitory computer readable storage medium that, when compiled, may be executed on a processor or microprocessor.

It will be apparent to those skilled in the art that various modifications may be made in the present invention, without departing from the spirit or the scope of the invention. Thus, it is intended that the present invention cover modifications and variations of this invention provided they come within the scope of the appended claims and their equivalent.

What is claimed is:

1. A method, comprising:
   at a user device ("UE") connected to a base station ("BS") of a network:
   receiving a first value of a BS parameter from the BS;
   determining a second value of a signal quality parameter corresponding to a signal received by the UE from the BS; and
   selecting an operating mode for a receiver of the UE based on comparing the first value and the second value to corresponding thresholds,
   wherein one of the signal quality parameter or the BS parameter is a primary parameter and the other one is a secondary parameter,
   wherein the threshold for the secondary parameter is based on the threshold for the primary parameter, and
   wherein the operating mode comprises implementing at least one interference mitigation technique.

2. The method of claim 1, wherein the at least one interference mitigation technique comprises one of a cell reference-symbol interference-mitigation ("CRS-IM") or a cell reference-symbol interference-cancellation ("CRS-IC").

3. The method of claim 1, wherein the at least one interference mitigation technique comprises a PDCCH-Only, wherein the PDCCH-Only comprises one of an early PDCCH or an only PDCCH.

4. The method of claim 1, wherein the BS parameter comprises a scheduling rate.

5. The method of claim 1, wherein the signal quality parameter comprises one of a signal interference ratio ("SIR"), a signal noise ratio ("SNR") or a block error rate ("BLER").

6. The method of claim 1, wherein the selecting the operating mode is further based on one of a third value of a further BS parameter or a fourth value of a further signal quality parameter.

7. The method of claim 1, wherein the operating mode comprises implementing at least two interference mitigation techniques.

8. The method of claim 1, wherein the UE is configured with at least five thresholds and the operating mode comprises at least two operating modes and a first operating mode is selected when one of:
   (a) the first value exceeds a first threshold and the second value exceeds a second threshold;
   (b) the first value is between the first threshold and a third threshold and the second value exceeds a fourth threshold that is less than the second threshold; or
   (c) the first value is less than the third threshold and the second value exceeds a fifth threshold that is less than the fourth threshold.

9. The method of claim 8, wherein the UE is configured with at least eight thresholds and a second operating mode is selected when one of:
   (a) the first value exceeds the first threshold and the second value is between the second threshold and a sixth threshold;
   (b) the first value is between the first threshold and the third threshold and the second value is between the fourth threshold and a seventh threshold; or
   (c) the first value is less than the third threshold and the second value is between the fifth threshold and an eighth threshold.

10. The method of claim 9, wherein the operating mode further comprises a third operating mode that is selected when one of:
    (a) the first value exceeds the first threshold and the second value is less than the sixth threshold;
    (b) the first value is between the first threshold and the third threshold and the second value is less than the seventh threshold; or
    (c) the first value is less than the third threshold and the second value is less than the eighth threshold.

11. A user equipment ("UE"), comprising:
    a transceiver configured to receive a first value of a base station ("BS") parameter and a signal from a BS; and
    a processor configured to determine a second value of a signal quality parameter based on the signal received from the BS and select an operating mode for a receiver of the transceiver based on comparing the first value and the second value to corresponding thresholds,
    wherein one of the signal quality parameter or the BS parameter is a primary parameter and the other one is a secondary parameter,
    wherein the threshold for the secondary parameter is based on the threshold for the primary parameter, and
    wherein the operating mode comprises implementing at least one interference mitigation technique.

12. The UE of claim 11, wherein the at least one interference mitigation technique comprises one of a cell reference-symbol interference-mitigation ("CRS-IM"), a cell reference-symbol interference-cancellation ("CRS-IC") or a PDCCH-Only.

13. The UE of claim 11, wherein the BS parameter comprises a scheduling rate and the signal quality parameter comprises one of a signal interference ratio ("SIR"), a signal noise ratio ("SNR") or a block error rate ("BLER").

14. The UE of claim 11, wherein the processor further bases the selection of the operating mode on one of a third value of a further BS parameter or a fourth value of a further signal quality parameter.

15. The UE of claim 11, wherein the UE is configured with at least five thresholds and the operating mode comprises at least two operating modes and the processor selects a first operating mode when one of:

(a) the first value exceeds a first threshold and the second value exceeds a second threshold;
(b) the first value is between the first threshold and a third threshold and the second value exceeds a fourth threshold that is less than the second threshold; or
(c) the first value is less than the third threshold and the second value exceeds a fifth threshold that is less than the fourth threshold.

16. The UE of claim 11, wherein the UE is configured with at least eight thresholds and the processor selects a second operating mode when one of:
(a) the first value exceeds the first threshold and the second value is between the second threshold and a sixth threshold;
(b) the first value is between the first threshold and the third threshold and the second value is between the fourth threshold and a seventh threshold; or
(c) the first value is less than the third threshold and the second value is between the fifth threshold and an eighth threshold.

17. An integrated circuit, comprising:
circuitry configured to receive a first value of a base station ("BS") parameter;
circuitry configured to determine a second value of a signal quality parameter; and
circuitry configured to select an operating mode for a receiver of a user equipment (UE) based on comparing the first value and the second value to corresponding thresholds,
wherein one of the signal quality parameter or the BS parameter is a primary parameter and the other one is a secondary parameter,
wherein the threshold for the secondary parameter is based on the threshold for the primary parameter, and
wherein the operating mode comprises implementing at least one interference mitigation technique.

* * * * *